(12) United States Patent
McCracken

(10) Patent No.: US 6,427,965 B1
(45) Date of Patent: Aug. 6, 2002

(54) SHOCK AND VIBRATION DAMPING PAD AND SYSTEM

(76) Inventor: Ronald G. McCracken, 8924 W. La., Magnolia, TX (US) 77355

( * ) Notice: Subject to any disclaimer, the term of this patent is extended or adjusted under 35 U.S.C. 154(b) by 0 days.

(21) Appl. No.: 09/724,150

(22) Filed: Nov. 28, 2000

(51) Int. Cl.[7] .......................... F16M 13/00; B32B 3/12
(52) U.S. Cl. ....................... 248/633; 248/636; 248/562; 248/346.01; 428/116; 428/327
(58) Field of Search ................................ 248/633, 636, 248/686, 688, 632, 634, 637, 638, 678, 346.01, 346.02, 346.5, 562; 428/116, 327

(56) References Cited

U.S. PATENT DOCUMENTS

| | | | | |
|---|---|---|---|---|
| 2,661,943 A | * | 12/1953 | Wilbur | 267/2 |
| 3,144,228 A | * | 8/1964 | Kass | 248/633 |
| 3,251,076 A | * | 5/1966 | Burke | 428/116 |
| 3,311,331 A | * | 3/1967 | Steimen | 248/633 |
| 3,436,042 A | * | 4/1969 | Goubergen | 248/636 |
| 3,679,159 A | * | 7/1972 | Bach et al. | 248/562 |
| 4,066,234 A | * | 1/1978 | Nycum | 248/558 |
| 4,210,698 A | * | 7/1980 | Watson | 428/327 |
| 4,393,999 A | * | 7/1983 | Forshee | 248/246.02 |
| 4,489,991 A | | 12/1984 | Delam | |
| 4,493,471 A | * | 1/1985 | McInnis | 248/580 |
| 4,643,386 A | * | 2/1987 | Chastine | 248/632 |
| 4,887,788 A | * | 12/1989 | Fischer et al. | 248/562 |
| 5,065,555 A | * | 11/1991 | Kobori et al. | 52/167.7 |
| 5,738,330 A | | 4/1998 | Folkens et al. | |
| 5,797,228 A | | 8/1998 | Kemeny | |
| 5,816,554 A | | 10/1998 | McCracken | |
| 5,816,559 A | | 10/1998 | Fujimoto | |
| 5,961,093 A | * | 10/1999 | Jones et al. | 248/678 |

* cited by examiner

*Primary Examiner*—Anita King
(74) *Attorney, Agent, or Firm*—Shawn Hunter; Bracewell & Patterson, L.L.P.

(57) ABSTRACT

Resilient shock absorbing pads that fully support ground contacting portions of machines, equipment or other loads and, thereby, provide protection from shocks and vibration. The pads receive the ground contacting portions of a load, such as a base plate. Described pads are square-shaped and are substantially formed of a resilient shock and vibration absorbing material, such as elastomer. It is particularly preferred that the pads be fashioned from compression-molded crumb rubber that is readily available from recycled tires. The pads also include structures, such as recessed portions or an upwardly extending rigid dowel, that help to stabilize a load.

18 Claims, 4 Drawing Sheets

SHOCK AND VIBRATION DAMPING PAD AND SYSTEM

BACKGROUND OF THE INVENTION

1. Field of the Invention

The present invention relates to methods and devices for use with machinery, structures and other loads for absorbing or dampening shocks and vibrations.

2. Description of the Related Art

Environmental vibrations and shocks can damage or degrade the performance of machinery and devices that are located on the floor of a plant, such as mchines for manufacture or testing of a product, or those on the rooftop of a building, such as antennae or heating and cooling units.

It is desirable to protect such machinery as much as possible from vibration and shock in order to prevent or reduce possible damage to the equipment. Such vibration and shocks may have a number of causes. However, the most serious are shocks and vibrations caused by seismic activity, such as earthquakes and tremors.

A number of cushioning or dampening devices are known that attempt to reduce or eliminate shocks and vibrations of this type. U.S. Pat. No. 5,816,559, entitled "Seismic Isolation Device," for example, describes a number of relatively complex mechanical arrangements for isolating portions of machinery for protection from shocks and Unfortunately, devices such as these often require significant amounts of maintenance and upkeep.

SUMMARY OF THE INVENTION

The devices and systems of the present invention provide resilient shock absorbing pads that fully support ground contacting portions of machines, equipment or other loads and, thereby, provide protection from shocks and vibration. In exemplary described embodiments, the pads provide cushioned recesses that receive the ground contacting portions of a load, such as a base plate. The pads are square-shaped and are substantially formed of a resilient shock and vibration absorbing material, such as elastomer. It is particularly preferred that the pads be fashioned from compression-molded crumb rubber that is readily available from recycled tires. The pads also include structures, such as recessed portions or an upwardly extending rigid dowel, that help to stabilize a load.

DETAILED DESCRIPTION OF THE PREFERRED EMBODIMENTS

Figure 1:
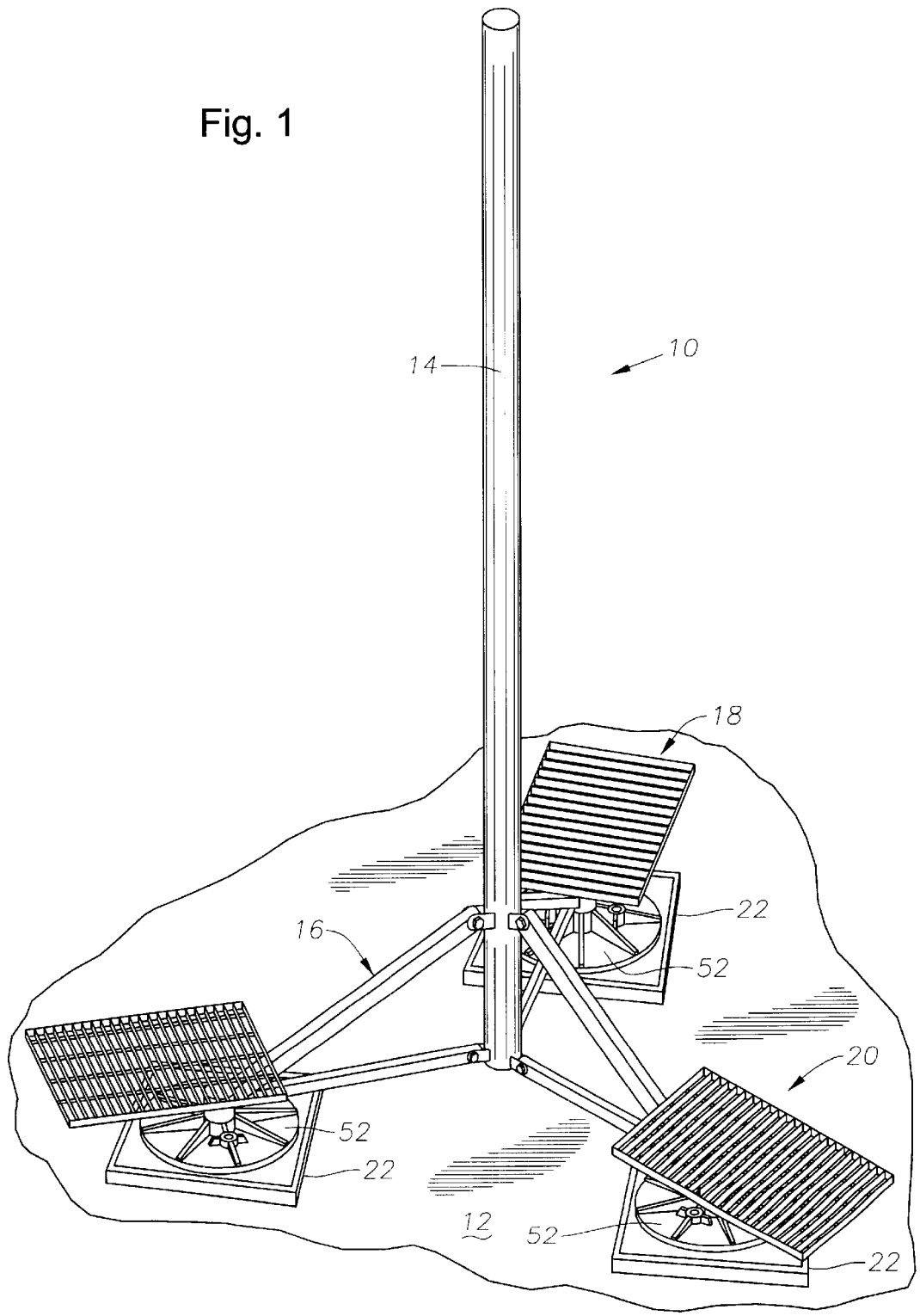
FIG. 1 depicts an exemplary piece of machinery, an antenna mount in this case, that is isolated from the support surface using seismic pads.

The system and devices of the present invention are useful to isolate and protect a piece of equipment, or other structure, from shocks and vibration, including those associated with seismic activity. As an example, FIG. 1 illustrates a portion of a telecommunications antennae structure 10 that is disposed on a support surface 12. The depicted arrangement is representative of the placement of such antenna structures on the rooftops of buildings. It is an object of the invention to reduce or dampen the amount of vibration or shocks that are transmitted from the support surface 12 to the antenna structure 10. The antenna structure 10 has a central mounting shaft 14 with three support legs 16, 18, 20 that support the mounting shaft 14. As can be seen, each of the legs 16, 18, 20 has a circular base plate 52 at its lower end. The base plate 52 is the portion of the structure 10 that is ground-contacting, or intended to contact the ground or support surface 12. Base plates of this type are described in U.S. Pat. No. 5,816,554 entitled "Equipment Support Base" and issued to McCracken. That patent is incorporated herein by reference. The base plates 52 each reside within a seismic isolation pad 22 which is disposed upon the support surface 12. The seismic isolation pads 22 may have one of several constructions, which are understood with reference to FIGS. 2–6 and the following descriptions. These different constructions are described separately as pads 50, 70 and 90.

Figure 2:
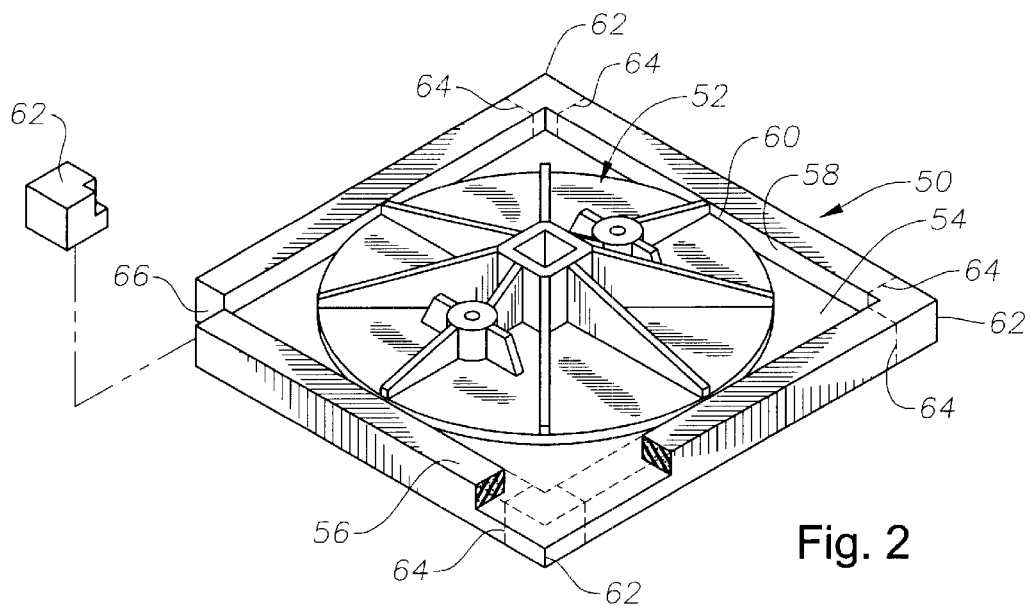
FIG. 2 is an isometric view, partially cutaway, of a first type of seismic pad constructed in accordance with the present invention.

FIG. 2 depicts a first seismic isolation pad 50 that is used to isolate and protect base plate 52. The substantially square isolation pad 50 is formed of a resilient, energy absorbent material. Preferably, the pad 50 is formed of molded elastomer. In a currently preferred embodiment, the pad 50 is made up of crumb rubber that is compression molded. It has been found that this type of material is readily available from recycled tires and can be easily compression molded and formed. Additionally, the crumb rubber may be easily colored using dyes or paints during the molding process.

The pad 50 has a substantially flat base portion 54 upon which the base plate 52 is seated. The base portion 54 of the pad 50 has a thickness of approximately 1 inch. An upwardly protruding flange 56 is disposed along the perimeter of the pad 54, thereby making the base portion 54 recessed with respect to the flange 56. The lower portion of FIG. 2 is a partial cutaway with a portion of the flange 56 not visible. It is preferred that the pad 50 be sized so that there is always a slight gap between the inner wall 58 of the flange 56 and the outer edge 60 of the base plate 52. The flange 56 preferably has a height (as measured upwardly from the base portion 54) of 1 inch. The flange 56 helps ensure that the base plate 52 does not inadvertently slide off of the pad 50.

The pad 50 has four corner portions 62. There are perforations, scoring or other lines of structural weakness 64 disposed within the material of the pad 50 so that the corner portions 62 may be easily broken away and removed from the pad 50. One of the four corner portion 62 is shown broken away in FIG. 2. When the corner portions 62 are removed, openings 66 (one shown) are formed that allow water within the pad 50 to drain out of the interior of the pad 50.

Figure 3:
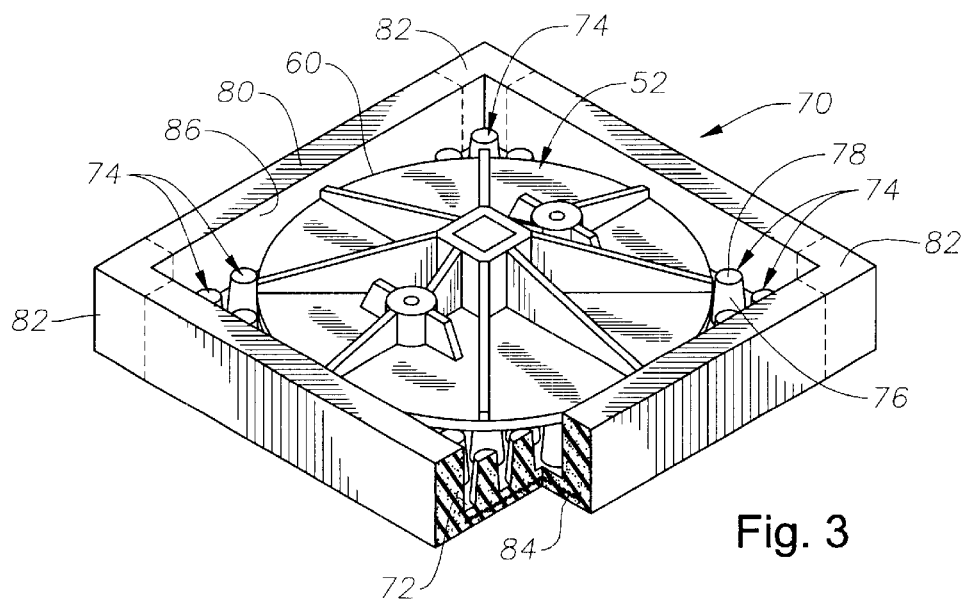
FIG. 3 is an isometric view, partially cutaway, of a second type of seismic pad constructed in accordance with the present invention.
Figure 3A:
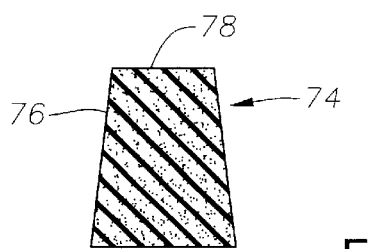
FIG. 3A is a cross-sectional detail of a support cones used in the seismic pad shown in FIGS. 3 and 4.
Figure 4:
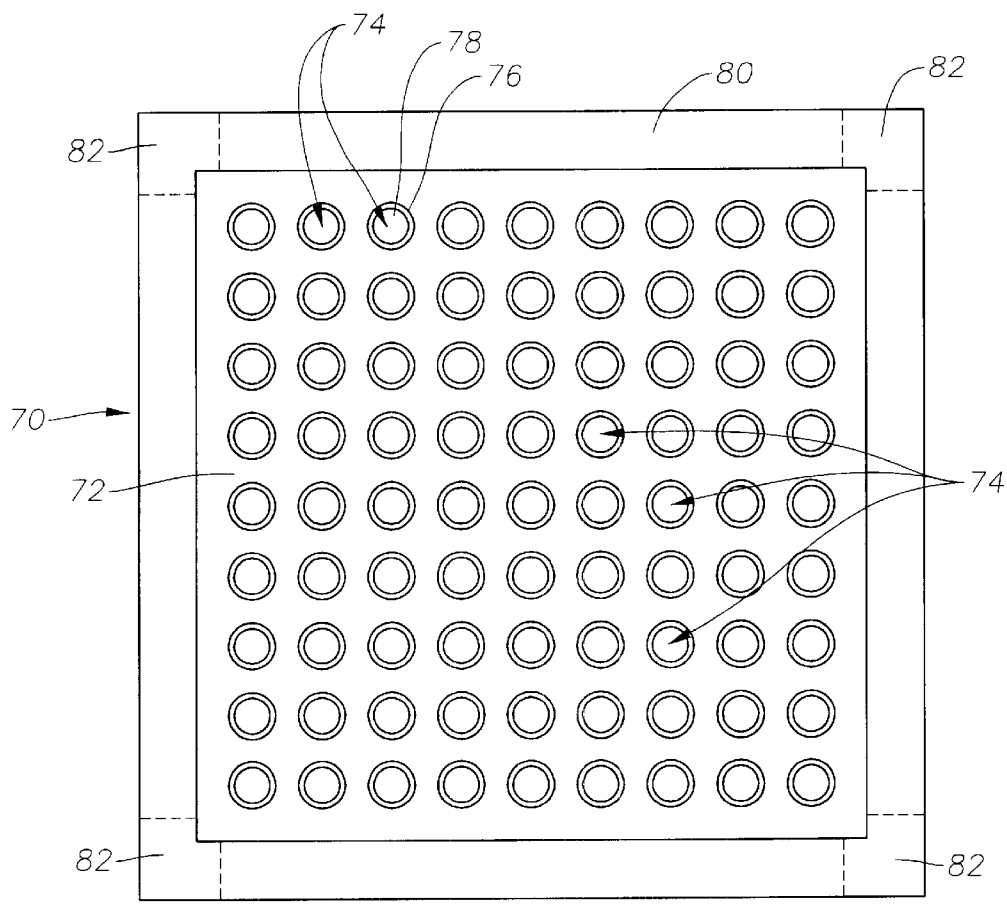
FIG. 4 is a plan view of the seismic pad depicted in FIG. 3.

FIGS. 3, 3A and 4 depict an alternative, and currently preferred, isolation pad 70 that is also being used to isolate and protect a base plate 52. The pad 70 is similar in many respects to the pad 50 described previously. There are some differences, however. The pad 70 includes a recessed base portion 72 having a substantially flat surface from which a number of frustoconical support cones 74 project upwardly. One of the support cones 74 is shown in cross-section in FIG. 3A. It is preferred that the support cones 74 be integrally molded with the base portion 72 during fabrication of the pad 70. Each of the support cones 74 has a tapered side surface 76 and a flat top surface 78 upon which the base plate 52 or other structure may rest. The lower end of each support cone 74 is wider than the upper end by virtue of the tapered side surface 76. In the currently preferred embodiment, the upper end of the cone 74 has a diameter of one inch while the lower end of the cone 74 has a diameter of 1¼ inches.

Like the first isolation pad 50, the isolation pad 70 has a flange 80 that surrounds the perimeter of the pad 70. In a currently preferred embodiment, the flange 80 has a total height (as measured from its top end to its bottom end) of four inches. The base portion 72 has a thickness of 1 inch and each of the support cones 74 has a height of 1½ inches. Breakaway corner portions 82, similar to the corner portions 62 are provided as well to allow drainage of the pad 70.

Unlike the pad 50, the pad 70 contains a sheet 84 of reinforcing material that is embedded or molded into the base portion 72. The sheet is formed of a woven cloth material to resist tensile forces that might tend to rupture the pad 70.

The pad 70 is also sized so that a gap is provided between the inner surface 86 of the flange 80 and the outer rim 60 of the base plate 52. The base plate 52, therefore, rests entirely on the support cones 74 of the pad 70.

Figure 6:
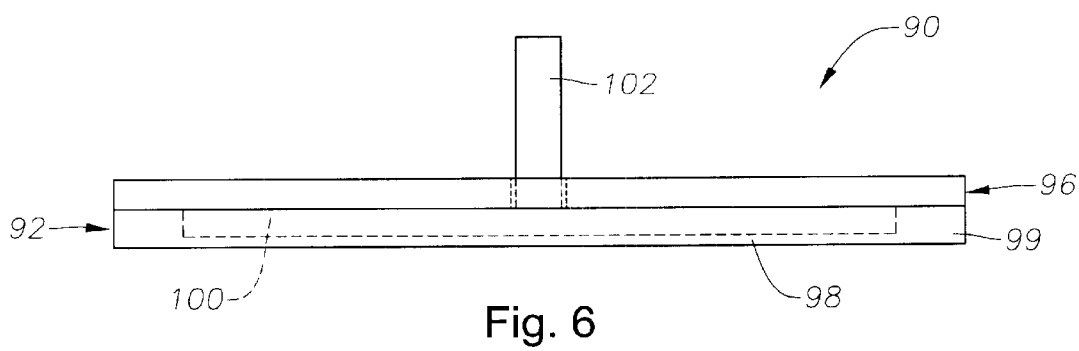
FIG. 6 is a side view of the pad shown in FIG. 5.
Figure 5:
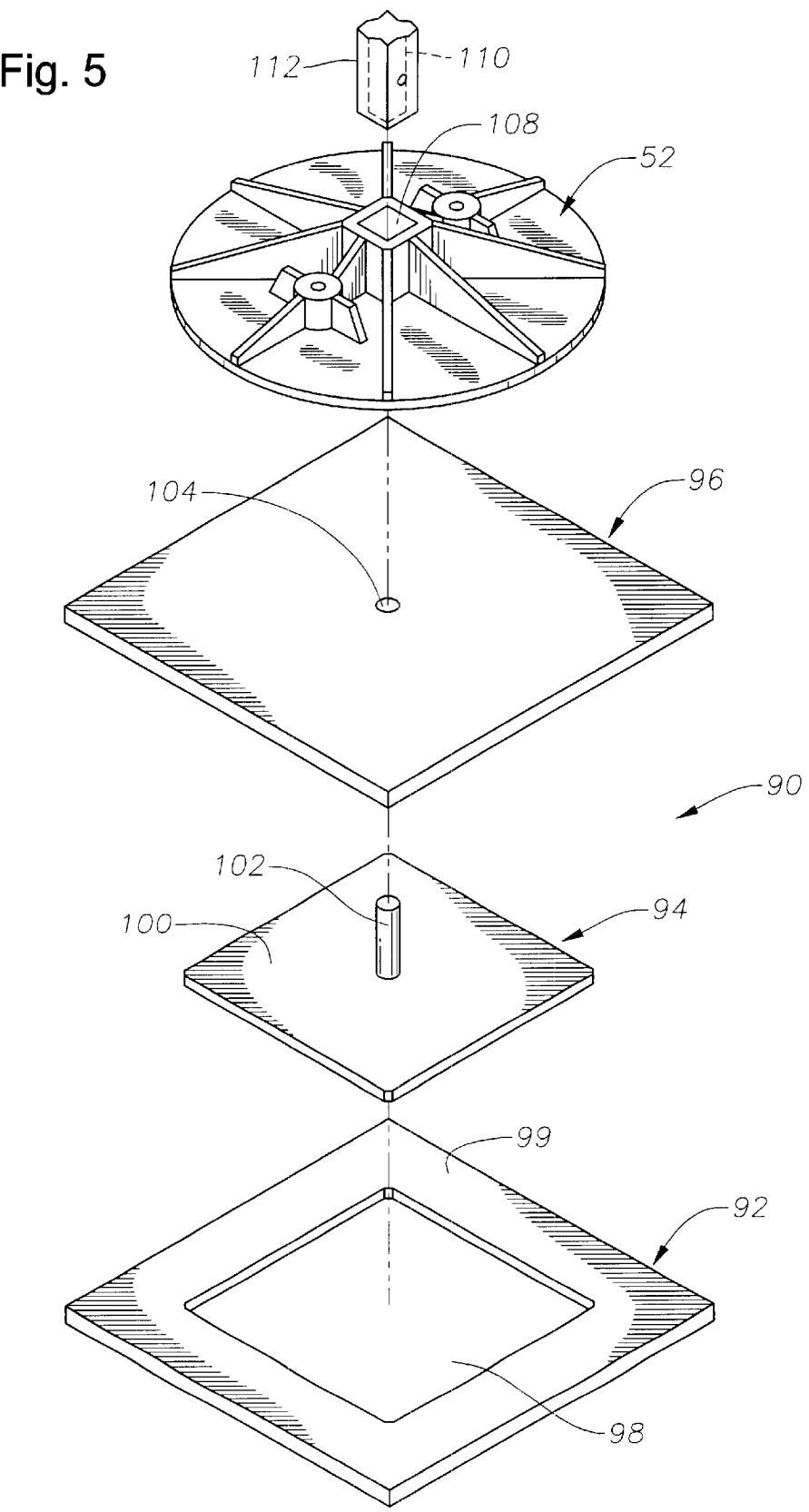
FIG. 5 is an exploded view illustrating a third type of seismic pad.

FIGS. 5 and 6 illustrate a third exemplary embodiment for an isolation pad 90. The isolation pad 90 is actually an assembly of three separate components and, thus, is illustrated using an exploded view. The pad 90 includes a base pad member 92, dowel plate 94 and cover pad 96. The base pad member 92 and cover pad 96 are both formed of the same resilient shock absorbent material as the pads 50 and 70 described earlier. The dowel plate 94 is formed of wood, metal or another rigid material.

The base pad 92 is the part of the isolation pad 90 that rests on the support surface. The base pad 92 includes a square, recessed central area 98 and a raised lip 99 that surrounds that recessed area 98.

The base pad 92 is the part of the isolation pad 90 that rests on the support surface. The base pad 92 includes a square, recessed central area 98 and a raised lip 99 that surrounds that recessed area 98.

The dowel plate 94 has a flat plate portion 100 and a centrally located dowel 102 that projects upwardly from the plate portion 100. The cover pad 96 has a centrally located aperture 104 through which the dowel 102 is disposed when the cover pad 96 is placed over the dowel plate 94. When the pad 90 is assembled, the dowel 102 projects upwardly and is disposed through the central cavity 108 of base plate 52 and fit within the center 110 of a support leg 112. (see FIG. 5). In this manner, the dowel 102 contacts at least the leg 112 of the supported structure and stabilizes it with respect to the support surface below.

In use, individual base plates 52 or other ground-contacting portions of a structure to be isolated are disposed upon pads having constructions such as those shown in FIGS. 2–5. Shocks and vibrations are substantially absorbed by the pads. A plurality of pads are placed under a plurality of ground contacting portions of a machine or other load in order to provide a system that will isolate the machine or load from the support structure as well as environmental shocks and vibrations.

The ground-contacting portion of the supported structure is stabilized with respect to the pad by a structure on the pad itself to help ensure that the structure does not indvertently slide off of the pad. When pads having the construction of the pads 50 or 70 are used, the side flanges 56, 80 help to stabilize the base plate 52. When the pad 90 is used, the dowel 102 stabilizes the base plate 52. The pads 50, 70 and 90 are modular, preformed and lightweight. They are also essentially maintenance-free. The pads may be easily stacked and transported.

While the invention has been shown or described in only some of its forms, it should be apparent to those skilled in the art that it is not so limited, but is susceptible to various changes within departing from the scope of the invention.

What is claimed is:

1. An isolation pad for protecting a structure from shocks or vibrations, the isolation pad comprising:
   a base portion to be disposed upon a support surface and beneath a portion of a piece of equipment to be supported, the base portion being formed of a shock absorbent material, a portion of the pad being broken away to provide a drainage opening.

2. The isolation pad of claim 1 wherein the base portion is substantially comprised of A an elastomeric material.

3. The isolation pad of claim 2 wherein the elastomeric material comprises crumb rubber that has been compression molded.

4. The isolation pad of claim 1 wherein the base portion has an outer perimeter and the pad further comprises a raised flange located along the perimeter.

5. The isolation pad of claim 1 wherein the base portion provides a substantially flat upper surface.

6. The isolation pad of claim 5 further comprising a plurality of frustoconical support cones disposed upon the upper surface of the base portion.

7. The isolation pad of claim 1 wherein the base portion provides an upwardly protruding dowel to engage a portion of the structure to be supported for stabilization of the structure.

8. The isolation pad of claim 1 wherein the base portion further comprises an embedded sheet of reinforcing material to help prevent damage to the pad from tensile forces.

9. The isolation pad of claim 1 further comprising:
   a cover pad that overlays the base portion; and
   a plate member formed of a substantially rigid material that is disposed between the base portion and the cover pad.

10. The isolation pad of claim 1 further comprising at least one opening in the pad to permit drainage.

11. A system for isolating and protecting machinery or equipment loads from vibration and shock, comprising a plurality of shock-absorbent pads that are disposed beneath ground contacting portions of a load, the pads being formed of compression molded crumb rubber, the pads being substantially rectangular in shape and further comprising an embedded cloth member for strengthening the pad against tensile forces.

12. The system of claim 11 wherein at least one pad comprises a recessed central portion to receive a ground-contacting portion of a load.

13. The system of claim 12 further comprising an upwardly protruding flange that substantially surrounds the recessed portion.

14. The system of claim 11 wherein at least one pad comprises an upwardly extending dowel member to contact and stabilize a ground-contacting portion of a load.

15. The system of claim 11 wherein at least one pad further comprises a breakaway comer portion that can be readily removed to create a drainage opening for drainage of the pad.

16. The system of claim 11 wherein the system further comprises a plurality of support cones located on an upper surface of at least one pad to contact and support a load.

17. A pad for the absorption of shock and vibration, comprising:
   a) a base portion having an underside for contacting a support surface;
   b) an upper surface for contacting and supporting a load, the upper surface comprising:
      1) a recessed portion for receiving a ground-contacting portion of the load, the recessed portion having a substantially flat upper contacting surface;
      2) a raised sidewall flange substantially surrounding the recessed portion; and
      3) at least one frustoconical support member that extends upwardly from the upper contacting surface of the recessed portion.

18. The pad of claim 17 further comprising an embedded cloth member for strengthening the pad against tensile forces.

* * * * *